United States Patent [19]
Cox

[11] Patent Number: 5,383,013
[45] Date of Patent: Jan. 17, 1995

[54] STEREOSCOPIC COMPUTER VISION SYSTEM

[75] Inventor: Ingemar J. Cox, Lawrenceville, N.J.

[73] Assignee: NEC Research Institute, Inc., Princeton, N.J.

[21] Appl. No.: 947,493

[22] Filed: Sep. 18, 1992

[51] Int. Cl.$^6$ .............................................. H04N 13/00
[52] U.S. Cl. ........................................................ 356/2
[58] Field of Search .............................................. 356/2

[56] References Cited

U.S. PATENT DOCUMENTS 5,179,441 1/1993 Anderson et al. ...................... 358/88

OTHER PUBLICATIONS

S. Skerjanc and J. Liu, "A three camera approach for calculating disparity and synthesizing intermediate pictures", Signal Processing Image Communications 4 (1991) pp. 55–64.

Primary Examiner—Richard A. Rosenberger
Attorney, Agent, or Firm—Arthur J. Torsiglieri; Philip J. Feig

[57] ABSTRACT

A stereoscopic computer vision system that uses a novel algorithm for obtaining the best match between corresponding features in the left and right images of desired objects in the image scene, finds the disparity between corresponding features in the left and right views and then uses the disparity to calculate the distance of the desired object from the two cameras used to provide the left and right images.

5 Claims, 2 Drawing Sheets

STEREOSCOPIC COMPUTER VISION SYSTEM

FIELD OF INVENTION

This invention relates to computer vision, and more particularly, relates to the problem of finding corresponding features in the left and right images of a stereoscopic view of a scene. Such a correspondence match is useful, as for example, in determining the depth or distance from the viewer to said features.

BACKGROUND OF THE INVENTION

As indicated above, in stereoscopic computer vision there is often a need to match the left and right images of a scene, usually in the presence of noise or other disturbances that introduce uncertainty and complicate making the match. As a consequence, a need has developed for algorithms that facilitate making correct correspondences. Correct correspondences are important for reliable depth estimation. Measuring depth or range via stereoscopic vision instead of by laser, radar or acoustic time-of-flight has several advantages. First, stereo ranging is passive, i.e. it does not need to broadcast a signal to illuminate the objects of interest. This is important for military surveillance. Second, time-of-flight devices measure the depth or range to a single point. These sensors are then spatially scanned to determine the depth of more than one point. In contrast, stereo vision allows the depth of almost all points in the image to be determined simultaneously, thereby providing the potential for a much faster range imaging sensor. Possible applications include the machine inspection of three dimensional surfaces, e.g. automobile body parts, to ensure that the surfaces are within specified tolerances. One can expect to use stereoscopic vision for various other functions.

FIG. 1 shows the general geometric structure of all stereo vision system. It consists of two cameras, whose optical axes needed not be parallel although they often are. Each camera forms an image of the world based on perspective projection. A point A, visible to both cameras, forms an image in each camera's image plane, denoted $A_l$ and $A_r$ respectively. If $A_l$ and $A_r$ are known, together with the relative position of one camera with respect to the other, then simple triangulation allows the distance to the point A to be inferred. Determining the corresponding image points $A_l$ and $A_r$ is probably the most difficult task associated with stereo imaging. Fortunately, geometric constraints restrict matches to be along epipolar lines. For each point A in the scene, there exists an epipolar plane that passes through said point and the line joining to centers of the two camera lenses. This plane intersects the image planes of the two cameras to form two corresponding epipolar lines, one in each image. In fact, all the scene points in a epipolar plane are projected onto the two epipolar lines. The two dimensional matching problem is thus reduced to determining a set of one-dimensional matches, which significantly reduces the complexity of the problem. Determining the location of the epipolar lines requires careful calibration of the camera system, but is straightforward. The key problem which is addressed by this invention is to determine the set of correspondences between the left and right epipolar lines, i.e. for each point i in the left line, its corresponding point j in the right image must be determined. The offset between i and j, (i−j) is called the disparity at point i. The epipolar lines are therefore assumed to be given and, for convenience, are assumed to be parallel to the scanlines of the two cameras.

In the past, stereoscopic vision has depended on relatively complex algorithms to determine the correspondence between two stereoscopic images necessary for an accurate measure of the depth or distance of the object. Previous stereo algorithms can be characterized by (1) the primitive features that are matched, (2) the local cost of matching two primitive features, and (3) the global cost and associated constraints. Previous matching primitives have almost exclusively been either edge or correlation based. Edge-based stereo suffers from (1) the need to extract edges—this can be a difficult process and is the subject of much current research—and (2) that the resulting depth map is very sparse. Only the depth at the edges is known, but edge points usually represent only a very small fraction of all the points in the image. Correlation-based techniques examine the correlation between the intensities within regions or windows of varying sizes. While feature extraction is eliminated, it is replaced by the more difficult need to adaptively change the size of the correlation window depending on whether or not the window is over a disparity discontinuity. This is also the subject of active research. Stereo algorithms include a local "cost" function that measures the degree of similarity between two features, and a global cost, the best set of matches being the one with the lowest global cost. Generally the local cost function consists of a weighted squared error term together with a regularization term that is based on the differences between neighboring disparities or disparity gradients. This term implicitly assumes that surfaces are smooth, which is not the case at depth discontinuities that generally are the most important features of any depth map. The effect of this regularization term is to smooth or blur depth discontinuities. The regularization term has been considered necessary to constrain matches to nearby points. In addition, two other constraints are common. The first is uniqueness, i.e. a point in the left image can match no more than a single point in the right image. The second constraint is ordering, i.e. if point $z_{l,i}$ matches point $z_{r,j}$ then the point $z_{l,i+1}$ must match a point $z_{r,j+k}$ where $k > 0$, i.e. the order of features in the left and right images is assumed preserved. This assumption is generally true for solid objects viewed from a distance, but can be violated for example by thin objects such as poles that are close to the observer.

The present invention seeks to improve upon the correct number of correspondences found between the two images by providing an improved algorithm for making the matches. This should result in systems with improved stereoscopic vision. It also facilitates determining the distance of a feature by stereoscopic computer vision.

The basic principles of stereo correspondence and definitions of much of the terminology being used in this application are included in a paper entitled "Computational Issues in Solving the Stereo Correspondence Problem" by J. P. Frisby and S. B. Pollard at pages 331–357 in a book entitled "Computational Models of Visual Processing" edited by M. S. Landy and J. A. Movshan, and published by the MIT Press, Cambridge, Mass. (1991).

SUMMARY OF THE INVENTION

The present invention when used for determining the distance of features comprises a system that includes a pair of cameras, or image pickup devices, spaced apart a known distance for providing two views of an image scene each including features whose distance from the cameras is to be determined and a computer that utilizes a novel stereo algorithm for finding a match between corresponding features in the left and right images, obtains the disparity of common features in the left and right images and derives the desired distance of the features from the disparities and the separation of the two cameras. The novel stereo algorithm depends on minimizing a global cost function that uses a Bayesian sensor fusion approach and that is the sum of two types of costs, a weighted squared error cost for matching two points and a penalty cost for not matching a point, subject to uniqueness, monotonicity and discontinuity (or cohesivity) constraints. In particular, the local cost function that is used is one that does not involve neighboring disparities or disparity gradients. The global minima can be most efficiently found using a dynamic programming algorithm that can typically be performed in parallel on each epipolar line of the two views of the image scene.

Specifically, there is derived a new equation that includes in its inner summation a first term that is the local cost of matching two features and a second term that is the cost of an occlusion and the summation of these two costs over all points in the two images becomes the global cost that is to be minimized.

Moreover, in order to avoid non-physical solutions to the minimization of the global cost equation, it is assumed that a feature in one view can match no more than one feature in the other view and vise versa (uniqueness) and that if point $z_{l,i}$ in the left image matches point $z_{r,j}$ in the right image, then the point $z_{l,i+1}$ must match a point $z_{r,j+k}$ where $k>0$, i.e. the common ordering constraint. Since solution to the above problem results in more than a single unique solution, a further set of constraints is introduced that minimize the number of horizontal and/or vertical discontinuities in the solution (cohesivity constraints). The minimization of the global cost equation with the uniqueness, ordering and cohesivity is readily solved by dynamic programming. The resultant will be described for the purposes of this application as the lowest global cost function equation.

The invention will be better understood from the following more detailed description.

DETAILED DESCRIPTION OF THE DRAWINGS

Figure 1:
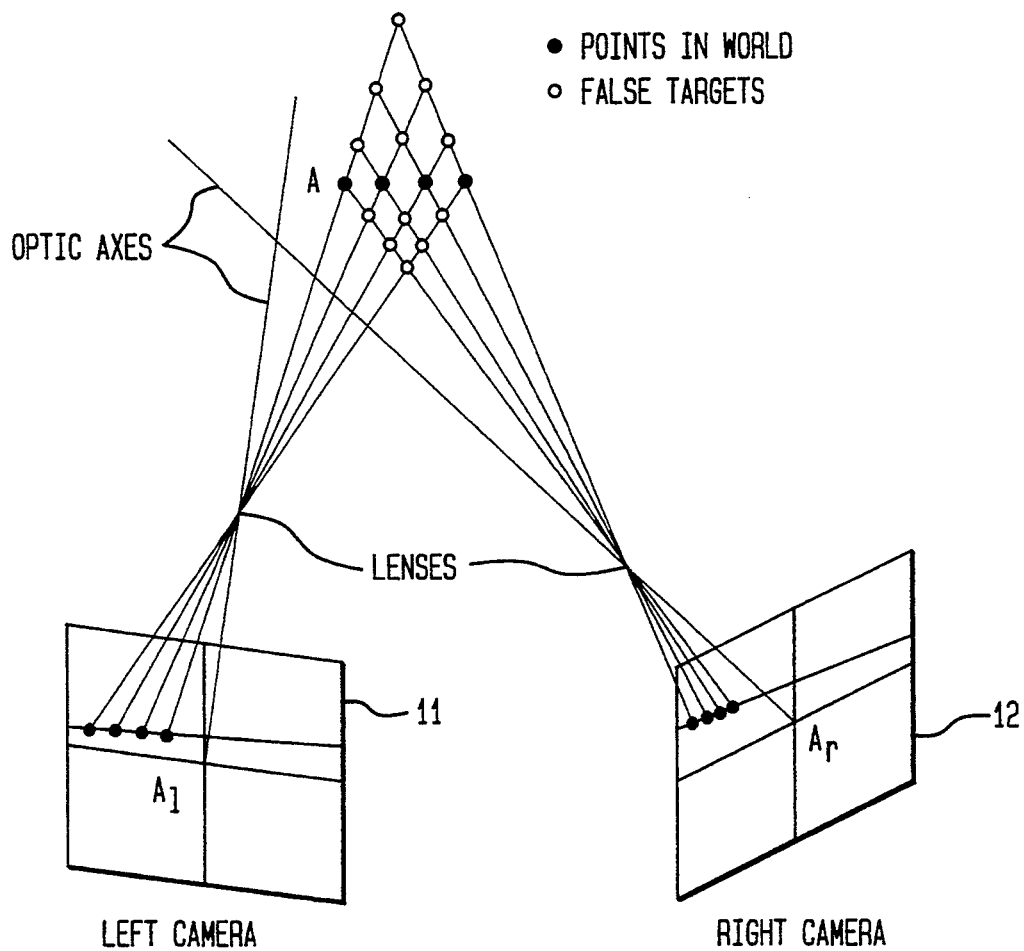
FIG. 1 shows in block diagram form the basic equipment needed for stereo vision systems.
Figure 2:
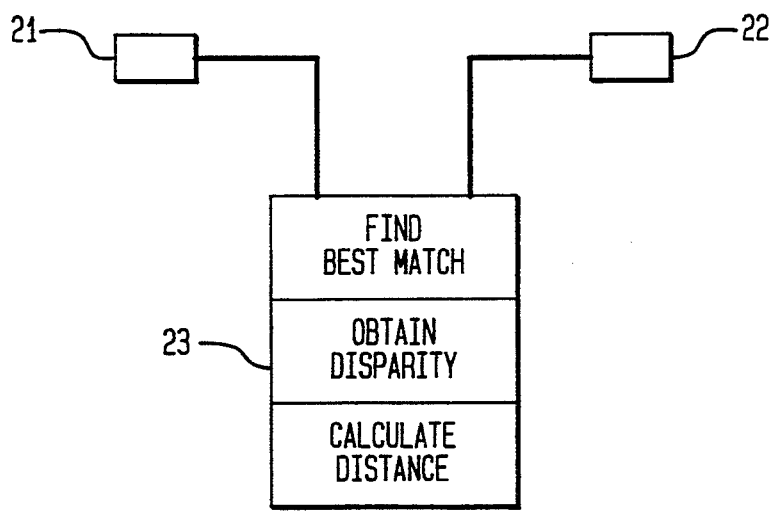
FIG. 2 shows in block diagram form the basic equipment for a computer vision system adapted for measuring the distance of an object in accordance with this aspect of the invention.

FIG. 2 shows the basic equipment needed for the invention. It includes a pair of cameras, 21, 22 spaced apart a known distance. The images formed by both cameras contain common features, i.e. the cameras see the same objects but from different views, whose distances to the cameras are to be determined. Typically, the cameras would be of the well known CCD form. The two cameras are operated so that at any given time the electrical signals that are generated in the cameras by the synchronized scanning of the image scene by each camera represents corresponding scan points of the image scene. The electrical signals generated by the two cameras are then supplied to a computer work station 23 that is appropriately programmed to do the signal processing, to be described in more detail below. In particular, the processing is made to yield as an output signal that is a function of the distance from tile two cameras, or their midpoint, of the specific features.

As has been mentioned above, an important element of the invention is the algorithm used by the computer workstation for establishing the stereo correspondence between the right and left views of an image scene of the features whose distance from the cameras are to be calculated. Accordingly, we will begin by describing the algorithm in greater detail.

As is typical of most stereo algorithms, matching of features in two views depends on measuring the cost of various matches to determine the set of matches of minimum cost. This set of matches then is treated as the correct set of correspondences. The novel algorithm involves first deriving the cost of either matching two features or declaring a feature occluded, after that there is derived a global cost that is then minimized to form the best set of matches.

With reference to FIG. 2, let the two cameras 21 and 22 be denoted by $s=\{1,2\}$ and let $Z_s$ represent the set of measurements obtained by each camera along corresponding epipolar lines:

$$Z_s = \{z_{s,is}\}_{is=0}^{ms}$$

where $m_s$ is the number of measurements from camera s and $z_{s,0}$ is a dummy measurement, the matching to which indicates no corresponding point. For epipolar alignment of the scanlines, $Z_s$ is the set of measurements along a scanline of camera s. The measurements $z_{s,is}$ might be simple scalar intensity values or higher level features. Each measurement $z_{s,is}$ is assumed to be corrupted by additive, white noise.

The condition that measurement $z_{1,i1}$ from camera 1, and measurement $z_{2,i2}$ from camera 2 originate from the same location, $x_k$, in space, i.e. that $z_{1,i1}$ and $z_{2,i2}$ correspond to each other, is denoted by $Z_{i1,i2}$. The condition in which measurement $z_{1,i1}$ from camera 1 has no corresponding measurement in camera 2 is denoted by $Z_{i1,0}$ and similarly for measurements in camera 2. Thus, $Z_{i1,0}$ denotes occlusion of feature $z_{1,i1}$ in camera 2.

Next, we need to calculate the local cost of matching two points $z_{1,i1}$ and $z_{2,i2}$. The likelihood that the measurement pair $Z_{i1,i2}$ originated from the same point $x_k$ is denoted by $\Lambda(Z_{i1,i2}|x_k)$ and is given by $$\Lambda(Z_{i1,i2}|x_k)=[P_{D1}p(z_{1,is}|x_k)]^{1-\delta} \quad [1-P_{D1}]^\delta \, [P_{D2}p(z_{2,is}|x_k)]^{1-\delta} \, [1-P_{D2}]^\delta \qquad (1)$$

where $\delta_{is}$ is an indicator variable that is unity if a measurement is not assigned a corresponding point, i.e. is occluded, and zero otherwise. The term $p(z|x)$ is a probability density distribution that represents the likelihood of measurement z assuming it originated from a point x in the scene. The parameter $P_{Ds}$ represents the probability of detecting a measurement originating from $x_k$ at sensor s. This parameter is a function of the number of occlusions, noise etc. Conversely, $(1-P_D)$ may be viewed as the probability of occlusion. If it is assumed that the measurements vectors $z_{s1is}$ are normally distributed about their ideal value z, then $$p(z_{s,is}|x_k) = |(2\pi)^d S_s|^{-\frac{1}{2}} \exp\{-\tfrac{1}{2}(z-z_{s,is})' S_s^{-1}(z-z_{s,is})\} \quad (2)$$

where d is the dimension of the measurement vectors $z_{s,is}$ and $S_s$ is the covariance matrix associated with the error $(z-z_{s,is})$. Since the true value, z, is unknown we approximate it by maximum likelihood estimate i obtained from the measurement pair $Z_{i1i2}$ and given by $$z \approx \hat{z} = S_{2,i2}(S_{1,i1}+S_2)^{-1} z_{1,i1} + S_{1,i1}(S_{1,i1}+S_{2,i2})^{-1} z_{2,i2} \quad (3)$$

where $S_{s,is}$ is the covariance associated with measurement $z_{s,is}$.

Now that we have established the cost of the individual pairings $Z_{i1,i2}$, it is necessary to determine the total cost of all pairs. Denote by $\gamma$ a feasible pairing of all measurements and let $\Gamma$ be the set of all feasible partitions, i.e. $\Gamma = \{\gamma\}$. If $\gamma_0$ denotes the case where all measurements are unmatched, i.e., the case in which there are no corresponding points in the left and right images, then we wish to find the pairings or partition $\gamma$ that maximizes $L(\gamma)/L(\gamma_0)$ where the likelihood $L(\gamma)$ of a partition is defined as $$L(\gamma) = p(Z_1, Z_2|\gamma) = \prod_{Z_{i1,i2}\in\gamma} \Lambda(Z_{i1,i2}|x) \left(\frac{1}{\phi_1}\right)^{n1} \left(\frac{1}{\phi_2}\right)^{n2} \quad (4)$$

where $\phi_s$ is the field of view of camera s and $n_s$ is the number of unmatched measurements from camera s in partition $\gamma$. The likelihood of no matches, $L(\gamma_0)$ is therefore given by $L(\gamma_0) = 1/(\phi_1^{n_1}\phi_2^{n_2})$ The maximization of $L(\gamma)/L(\gamma_0)$ is equivalent to $$\min_{\gamma\in\Gamma} J(\gamma) = \min_{\gamma\in\Gamma} [\ln(L(\gamma_0)) - \ln(L(\gamma))] \quad (5)$$

which leads to $$\min_{\gamma\in\Gamma} J(\gamma) = \quad (6)$$

$$\min_{\gamma\in\Gamma} \sum_{Z_{i1,i2}\in\gamma} \left\{ (1-\delta_{i1})\left[\tfrac{1}{2}(z-z_1)'S_1^{-1}(z-z_1)\right] + (1-\delta_{i2})\left[\tfrac{1}{2}(z-z_2)'S_2^{-1}(z-z_2)\right] + \delta_{i1}\left[\ln\left(\frac{P_{D1}}{(1-P_{D1})} \frac{1}{|(2\pi)^d S_1^{-1}|^{\frac{1}{2}}}\right)\right] + \delta_{i2}\left[\ln\left(\frac{P_{D2}}{(1-P_{D2})} \frac{1}{|(2\pi)^d S_2^{-1}|^{\frac{1}{2}}}\right)\right] \right\}$$

The first two terms in the inner summation of Equation (6) is the cost of matching two features while the last two terms are the cost of an occlusion/disparity discontinuity. Clearly, as the probability of occlusion $(1-P_{Ds})$ becomes small the cost of not matching a feature increases, as expected.

The minimization of Equation (6) the lowest global cost function equation is a classical weighted matching or assignment problem and there exist well known algorithms for solving this with polynomial complexity $O(N^3)$. See for example, the book entitled "Combinatorial Optimization" by C. H. Papadimitriou and K. Steiglitz, Prentice-hall 1982.

If the assignment problem is applied to the stereo matching problem directly, non-physical solutions are obtained. This is because Equation (6) does not constrain a match $z_{is}$ to be close to the match for $z_{(i-1)s}$, yet surfaces are usually smooth, except at depth discontinuities. In order to impose this smoothness condition, previous researchers typically have included a disparity gradient term to their cost function. The problem with this approach is that it tends to blur the depth discontinuities as well as to introduce additional free parameters that must be adjusted.

Instead, as discussed in a paper entitled "Stereo by intro and inter-scanline search using dynamic programming", IEEE Trans Pattern Analysis and Machine Intelligence PAMI-7(2) 139-154 (1985), we assume (1) uniqueness, i.e. a feature in the left image can match to no more than one feature in the right image and vice versa and (2) monotonic ordering, i.e. if $z_{i1}$ is matched to $z_{i2}$ then the subsequent measurement $z_{i1+1}$ may only match measurements $z_{i2+j}$ for which $j>0$. The minimization of Equation (6) subject to these constraints can be solved by dynamic programming.

Figure 3:
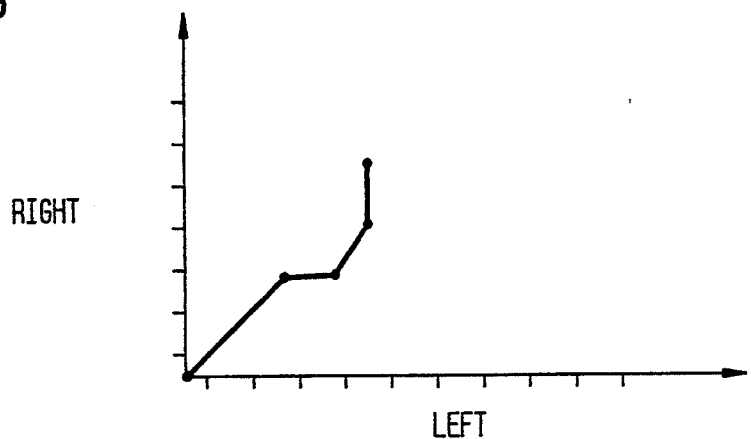
FIGS. 3, 4 and 5 are diagrams that will be useful in describing some principles of the invention.

To describe the matching algorithm, consider FIG. 3, in which the vertical axis represents points in the line in the left image (left line) and the horizontal axis represents points in the line in the right image (right line). A matching between point in the left and right lines can be represented as a contour or path. For example, FIG. 3 illustrates the case in which points i and 2 in the left line match points 1 and 2 in the right line; point 3 in the left line is unmatched (this is denoted by a horizontal line segment); point 4 on the left line is matched to point 3 on the right line; point 4 on the right line is unmatched (this is denoted by a vertical line segment ). A legal set of matches must satisfy the uniqueness and ordering constraints. These conditions prevent a legal path (match) from ever having a negative gradient, i.e. the path must be monotonically increasing.

Figure 4:
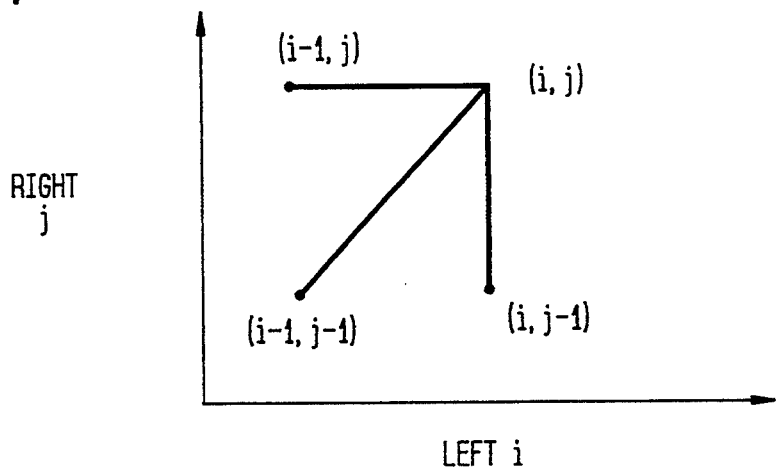

Finding the best match between the two lines of length M and N respectively, is a recursive procedure. Thus, with reference to FIG. 4, which is the same type of diagram as FIG. 3, in order to determine the best match between the first i points in the left line and the first j points in the right line, we first find the best match for (i) the first i−1 points in the left line and the first j−1 points in the right line, denoted C(i−1,j−1) (ii) the first i−1 points in the left line and the first j points in the right line, denoted C(i−1,j) and (iii) the first i points in the left line and the first j−1 points in the right line, denoted C(i,j−1). These costs are important because a legal path to (i,j) in FIG. 4 must come from one of three places, (i−1,j−1), (i−1,j) or (i,j−1) as depicted in FIG. 4. This is equivalent to saying that the cost of matching the first i points in the left line with the first j points in the right line is the minimum of either 1. the cost of matching the first i−1 points in the left line and the first j−1 points in the right line, denoted C(i−1,j−1) plus the cost of matching point i with point j, denoted by c(i,j) and given by the first term of Equation (6). This is the diagonal path of FIG. 4.
2. the cost of matching the first i−1 points in the left line and the first j points in the right line, denoted C(i−1,j) plus the cost of not matching point i, denoted by Occlusion and given by Equation (6). This is the horizontal path of FIG. 4.
3. the cost of matching the first i points in the left line and the first j−1 points in the right line, denoted C(i,j−1) plus the cost of not matching point j, also denoted by Occlusion and given by Equation (6). This is the vertical path of FIG. 4.

Since it is not only necessary to calculate the cost C(i,j) of the minimum path but also to reconstruct the path, a note of which path (horizontal, vertical or diagonal) taken to each point must be recorded. This is stored in a second array M(i,j).

Others have presented a solution to a similar problem using a dynamic programming algorithm with complexity $O(N^2M^2)$. We have improved this minimization procedure to O(NM): Of course, this general solution can be further improved by realizing that there is a practical limit to the disparity between two measurements. This is also true for human stereo, the region of allowable disparity being referred to as Panum's fusional area. If a measurement is $z_{i1}$ is constrained to match only measurements $z_{i2}$ for which $i_1 - \Delta x \leq i_2 \leq i_1 + \Delta x$ then the time required by dynamic programming algorithm can be reduced to linear complexity O(N).

Reconstruction of the optimum path then proceeds.

Appendix A attached hereto sets forth the pseudo-code describing how to calculate the optimum match. Appendix B sets forth the pseudo-code describing how to reconstruct the optimum match.

Experiments using this maximum likelihood procedure revealed that more than one global minimum often exists, i.e. there are multiple paths, each one of which has the same minimum cost. The algorithm arbitrarily chooses one of these paths, resulting in small variations between lines. The arbitrariness arises from the test for the minimum cost path, $$C(i,j) = \min(C(i-1,j-1) + c(i,j), C(i-1,j) + \text{Occlusion}, C(i,j-1) + \text{Occlusion}),$$

i.e. in deciding whether to take the horizontal, vertical or diagonal path to (i,j). This decision becomes arbitrary if more than one path is a minimum.

A more rational decision is to choose the "smoothest" path that minimizes the cost function C(i,j). There are many ways to define "smoothest". Previous stereo algorithms have incorporated a smoothing term into the cost function C(i, j) based on the difference in disparity between neighboring pixels. This regularization term penalizes large disparity changes arguing that most surfaces are smooth. However, surfaces are not smooth at depth discontinuities which are the most important features of depth maps. We have found that penalizing disparity gradients is unnecessary, provided that the common assumptions of uniqueness and monotonic ordering are made.

Instead of incorporating a smoothing term into the cost function C(i,j), a second optimization can be performed that selects from the set of solutions that minimize C(N,M), that solution which contains the least number of discontinuities. Performing this minimization after first finding all maximum likelihood solutions is very different from incorporating the discontinuity penalty into the original cost. The second level of minimization can be easily accomplished as part of the dynamic programming algorithm without having to enumerate all the maximum likelihood solutions. We could minimize (1) the number of horizontal discontinuities (MLMH) along a scanline or (2) the number of vertical discontinuities (MLMV) across scanlines or (3) the total number of horizontal and vertical discontinuities (MLMH+V), or (4) the number of horizontal then vertical discontinuities (MLMHMV) or (5) the number of vertical then horizontal discontinuities (MLMVMH). We develop algorithms for the first three scenarios, the last two being straightforward extensions.

Figure 5:
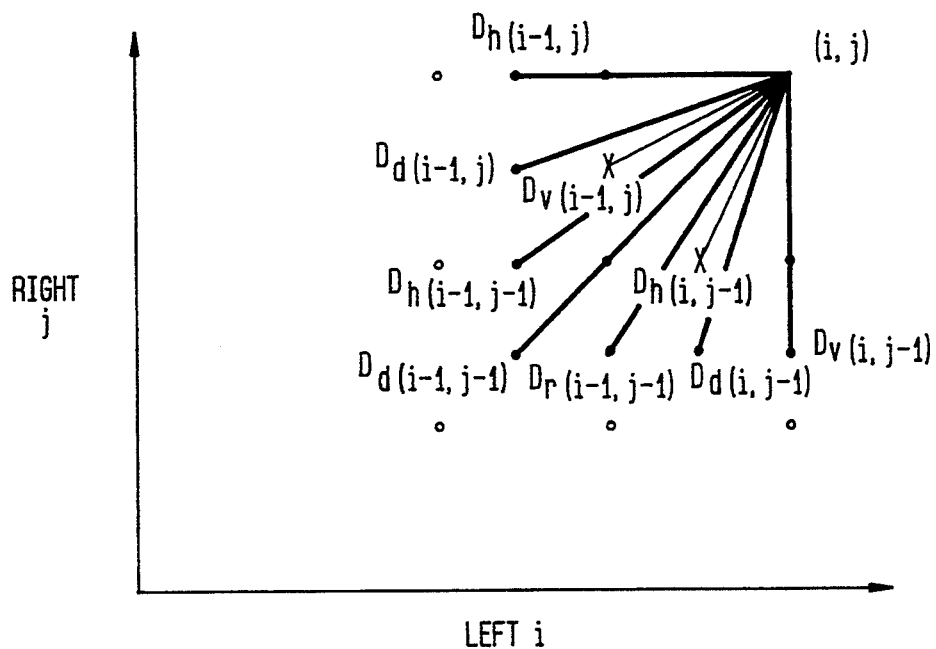

In order to minimize the number of horizontal discontinuities along an epipolar line, we must keep track of how we arrived at (i,j). This is done using three matrices labelled $D_v(i,j)$, $D_h(i,j)$, $D_d(i,j)$, denoting whether (i,j) was arrived at from a horizontal, vertical or diagonal path. This is depicted in FIG. 5 which is another diagram similar to that of FIGS. 3 and 4. The information stored in the D(i,j) matrices can then be used to break any ties that occur in the calculation of C(i,j). Algorithmically, this is accomplished as outlined in Appendix C. Notice that the M(i,j) matrix used for reconstruction is no longer used. Instead, the optimum path can be reconstructed directly from the D(i,j) matrices as outlined in Appendix D. Minimizing the number of horizontal discontinuities has the advantage that each scanline of the image can be solved independently and therefore in parallel.

An alternative optimization is to minimize the number of vertical discontinuities between scanlines. This appears to involve first finding the set of global minima for the ML problem for each epipolar line and then choosing one solution per line to minimize the total number of vertical discontinuities between scanlines. A difficulty lies in enumerating all the ML solutions per line. This problem is related to finding the k-best using dynamic programming. Instead, we an approximate solution. There are two methods that we have examined. In the first, the algorithm proceeds sequentially from bottom to top, minimizing the number of vertical discontinuities between the current line and the previous line. This is outlined in Appendix E. In the second solution, the solution to the ML problem is first computed, then, in a second iteration, we minimize the vertical disontinuities between the current line and the two lines directly above and below the current line obtained from the previous iteration. This procedure can be repeated further until convergence, though, in practice, two passes seems sufficient.

These two algorithms can be combined to minimize the sum of the horizontal and vertical discontinuities (MLMH+V). This is straightforward and outlined in Appendix F.

Finally, two other minimizations can be developed, that give precedence to either the horizontal or vertical discontinuities. These are maximum likelihood, minimum horizontal, minimum vertical discontinuities (MLMHMV) and maximum likelihood, minimum vertical, minimum horizontal discontinuities (MLMVMH). It is straightforward to develop these given the preceding results.

The global cost function of Equation (6) assumes that the left and right measurements of a corresponding point in the scene are normally distributed about some true value. This may not always be the case. Advantageously, both cameras should have identical responses to the same illumination. However, this may not be so in practice. Further, if the two stereo images are obtained sequentially from a single camera that is moved a known distance between images, illumination conditions may change, as for example, a cloud suddenly obscuring the sun. These variations in illumination can be modelled by a constant multiplicative factor A and a constant additive factor B, i.e.

$$I_l(x,y) = AI_r(x,y) + B \qquad (7)$$

If the number of occluded points is small compared to the overall number of pixels, then the intensity histograms for the left and right images are approximately the same except for the fixed offset B and the scaling term A. Estimation of the constants A and B was performed by first calculating the intensity histograms for both the left and right image, and then plotting the ten percentile points. A linear regression can then be performed on these points, the slope and intercept providing estimates for A and B respectively. Alternatively, a simple piecewise linear approximation can be performed between the ten percentile points. This normalization procedure significantly improves the performance of the algorithm if constant additive and or multiplicative constants are present.

Appendix A

```
Occlusion = [ln(P_Ds/(1-P_Ds) · 1/|(2π)^d S_s^-1|^½)]
for (i=1;i≤ N;i++){ C(i,0) = i*Occlusion }
for (i=1;i≤ M;i++) { C(0,i) = i*Occlusion}
for(i=1;i≤ N;i++){
    for(j=1;j≤ M;j++){
        min1 = C(i-1,j-1)+c(z_1,i,z_2,j);
        min2 = C(i,j-1)+Occlusion;
        min3 = C(i-1,j)+Occlusion;
        C(i,j) = cmin = min(min1,min2,min3);
        if(min1==cmin) M(i,j) = 1;
        if(min2==cmin) M(i,j) = 2;
        if(min3==cmin) M(i,j) = 3;
}}
```

Appendix B

```
p=N;
q=M;
while(p!=0 && q!=0){
    switch(M(p,q)){
        case 1:
            p matches q;
            p--;q--;
            break;
        case 2:
            p is unmatched;
            p--;
            break;
        case 3:
            q is unmatched;
            q--;
            break;
}}
```

Appendix C $$\text{Occlusion} = \left[\ln\left(\frac{P_{D_s}}{1-P_{D_s}} \frac{1}{|(2\pi)^d S_s^{-1}|^{\frac{1}{2}}}\right)\right]$$

```
for (i=1;i≤ N;i++){ C(i,0) = i*Occlusion }
for (i=1;i≤ M;i++) { C(0,i) = i*Occlusion}
for(i=1;i≤ N;i++){
    for(j=1;j≤ M;j++){
```
$\quad\quad$ min1 = $C(i-1,j-1)+c(z_{1,i},z_{2,j})$;
$\quad\quad$ min2 = $C(i,j-1)$+Occlusion;
$\quad\quad$ min3 = $C(i-1,j)$+Occlusion;
$\quad\quad$ C(i,j) = cmin = min (min1,min2,min3);
$\quad\quad$ if(min1==cmin)
$\quad\quad\quad$ $D_d$(i,j) = imin($D_d$(i-1,j-1), $D_h$(i-1,j-1)+1,$D_v$(i-1,j-1)+1);
$\quad\quad$ else
$\quad\quad\quad$ $D_d$(i,j) = HUGE;
$\quad\quad$ if(min2==cmin)
$\quad\quad\quad$ $D_h$(i,j) = imin($D_d$(i-1,j)+1, $D_h$(i-1,j),$D_v$(i-1,j)+1);
$\quad\quad$ else
$\quad\quad\quad$ $D_h$(i,j) = HUGE;
$\quad\quad$ if(min3==cmin)
$\quad\quad\quad$ $D_v$(i,j) = imin($D_d$(i,j-1)+1, $D_h$(i,j-1)+1,$D_v$(i,j-1));
$\quad\quad$ else
$\quad\quad\quad$ $D_v$(i,j) = HUGE;
}}

Appendix D

```
/*
 * Find start point and initialize costs d1, d2, and d3 together with the index counters e and
 * These are different for each of the three cases.
 */
p = NL;
q = NR;
switch(imin3(D1[p,q],D2[p,q],D3[p,q])){
    case 1:
        p matches q;
        d1=0; d2=1; d3=1;
        e=1; f=1;
        break;
    case 2:
        p is unmatched;
        d1=1; d2=0; d3=1;
        e=1; f=0;
        break;
    case 3:
        q is unmatched;
        d1=1; d2=1; d3=0;
        e=0; f=1;
        break;
```

```
    }
/*
 * Now begin reconstruction
 */
while(p>0 && q>0){
    switch(imin(D1[(p-e),q-f]+d1,D2[(p-e),q-f]+d2,D3[(p-e),q-f]+d3)){
        case 1:
            (p-e) matches (q-f);
            d1=0; d2=1; d3=1;
            p=p-e; q=q-f;
            e=1; f=1;
            break;
        case 2:
            (p-e) is unmatched;
            d1=1; d2=0; d3=1;
            p=p-e; q=q-f;
            e=1; f=0;
            break;
        case 3:
            (q-f) is unmatched;
            d1=1; d2=1; d3=0;
            p=p-e; q=q-f;
            e=0; f=1;
            break;
}}
```

Appendix E

```
for(i=1;i<=NL;i++){
    for(j=1;j<=ML;j++){
/*
 * Find minumum cost match
 * (i) C(i-1,j-1) + c(i,j) or
 * (ii) C(i-1,j) + Occlusion or
 * (iii) C(i,j-1) + Occlusion
 */
        cost1 = C(i-1,j-1) + c(z_{1,i},z_{2,j});
        cost2 = C(i,j-1) + Occlusion;
        cost3 = C(i-1,j) + Occlusion;
        cmin = min(cost1, cost2, cost3);
/*
 * In case of tie, e.g. cost1==cost2, then choice of match is chosen
 * to minimize the number of horizontal and vertical discontinuities
 *
```

```
 * The variable sum indicates whether a match occurred at (i-1,j-1)
 * (i,j) or (i+1,j)
 *
 * The V matrices count the number of vertical
 * discontinuities
 */
        if(abs(cmin-cost1)<ε){
            vcost= IsMatched();
            V1(i,j)=min(V1(i,j),V2(i,j),V3(i,j))+vcost;
        }
        else{
            V1(i,j)=BIG;
        }
        if(abs(cmin-cost2)<ε){
            vcost = IsLeftOcclusions();
            V2(i,j) = min(V1(i,j), V2(i,j), V3(i,j))+vcost;
        }
        else{
            V2(i,j)=BIG;
        }
        if(abs(cmin-cost3)<ε){
            vcost=IsRightOcclusion();
            V3(i,j) = min(V1(i,j), V2(i,j), V3(i,j))+vcost;
        }
        else{
            V3(i,j)=BIG;
        }
/*
 * Finally record minimum cost and increment pointers
 */
        C(i,j)=cmin;
    } }
```

Appendix F

```
for(i=1;i≤NL;i++){
    for(j=1;j≤ML;j++){
/*
 * Find minumum cost match
 * (i) C(i-1,j-1) + c(i,j) or
 * (ii) C(i-1,j) + Occlusion or
 * (iii) C(i,j-1) + Occlusion
 */
        cost1 = C(i-1,j-1) + c(z_{1,i},z_{2,j});
        cost2 = C(i,j-1) + Occlusion;
```

```
        cost3 = C(i-1,j) + Occlusion;
        cmin = min(cost1, cost2, cost3);
/*
 * In case of tie, e.g. cost1==cost2, then choice of match is chosen
 * to minimize the number of horizontal and vertical discontinuities
 *
 * The variable sum indicates whether a match occurred at (i-1,j-1)
 * (i,j) or (i+1,j)  *
 * The DV matrices count the number of horizontal and vertical
 * discontinuities
 */
        if(abs(cmin-cost1)< ε){
            vcost = IsMatched();
            DV1(i,j)=min(DV1(i-1,j-1),DV2(i-1,j-1)+1, DV3(i-1,j-1)+1)+vcost;
        }
        else{
            DV1(i,j)=BIG;  /* if not minimum then can't
                        use this path so set infinite*/
        }
        if(abs(cmin-cost2)< ε){
            vcost = IsLeftOcclusion();
            DV2(i,j) = min(DV1(i-1,j)+1, DV2(i-1,j), DV3(i-1,j))+vcost;
        }
        else{
            DV2(i,j)=BIG;
        }
        if(abs(cmin-cost3)< ε){
            vcost = IsRightOcclusion();
            DV3(i,j) = min(DV1(i,j-1)+1, DV2(i,j-1), DV3(i,j-1))+vcost;
        }
        else{
            DV3(i,j)=BIG;
        }
/*
 * Finally record minimum cost and increment pointers
 */
        C(i,j)=cmin;
    }
}
```

What is claimed:

1. A system for determining the distance of an object in a picture scene comprising:
   a pair of cameras spaced apart a known distance for converting left and right images of a picture scene including an object whose distance is to be found into left and right sets of pixel values along scan lines, and
   first signal processing means supplied with the pixel values of epipolar scan lines from each camera of said pair of cameras for finding a best match of pixels in the left image to pixels in the right image based on lowest global cost function of corresponding features along corresponding epipolar lines in each image subject to uniqueness, ordering and cohesivity constraints and for obtaining the disparity between the corresponding object in the scene in the left and right images along the pair of epipolar lines, and
   second signal processing means supplied with the disparity and with the known separation distance of said pair of cameras for providing a measurement of the distance of the object from said pair of cameras.

2. A system in accordance with claim 1 in which said first signal processing means is adapted to perform dynamic programming for finding the best match.

3. A method for determining the position of a feature by obtaining the best match between corresponding features in left and right images of a picture scene comprising the steps of:
   forming by using image pickup devices a left image and a right image of a picture scene containing a feature whose position relative to the image pickup devices is to be determined;
   obtaining respective epipolar lines in the left and right images of the picture scene;
   using the lowest global cost function equation for finding the best match between corresponding features in pairs of epipolar lines in the left and right images of the picture scene, subject to uniqueness, ordering and cohesivity constraints, and
   determining the position of the feature relative to the image pickup devices based upon finding the best match between corresponding features.

4. The method in accordance with claim 3 in which the features are the scalar intensity values of individual pixels.

5. The method in accordance with claim 3 in which said equation is normalized for any difference in illumination level and in the response level of the epipolar lines between the left and right images of the picture scene.

* * * * *